United States Patent [19]

Naruse

[11] Patent Number: 4,672,155
[45] Date of Patent: Jun. 9, 1987

[54] COORDINATE READER

[76] Inventor: Makoto Naruse, No. 456-7, Tokawa, Hadano-shi, Kanagawa-ken, Japan

[21] Appl. No.: 815,705

[22] Filed: Jan. 2, 1986

[30] Foreign Application Priority Data

Jan. 14, 1985 [JP] Japan .................................... 60-4489

[51] Int. Cl.$^4$ ............................................. G08C 21/00
[52] U.S. Cl. ....................................... 178/19; 323/218
[58] Field of Search ........................... 178/18, 19, 20; 340/870.31; 323/212, 218; 324/239; 318/687

[56] References Cited

U.S. PATENT DOCUMENTS 4,570,033 2/1986 Hulls ...................................... 178/19

Primary Examiner—Stafford D. Schreyer
Attorney, Agent, or Firm—Fulbright & Jaworski

[57] ABSTRACT

A coordinate reader comprises first and second conductor loops each having an electrical conductor so that electrical conductors of the respective conductor loops are juxtaposed on an electrically insulating board, a cosine function generator connected to one of the first and second conductor loops, a sine function generator connected to the other of the first and second conductor loops, a cursor incorporating a magnetic flux detecting coil for detecting magnetic fluxes generated in the conductor loops excited by the cosine and sine function generators, and a processor. The processor processes and controls operations of the aforementioned components to detect coordinates of the cursor.

2 Claims, 9 Drawing Figures

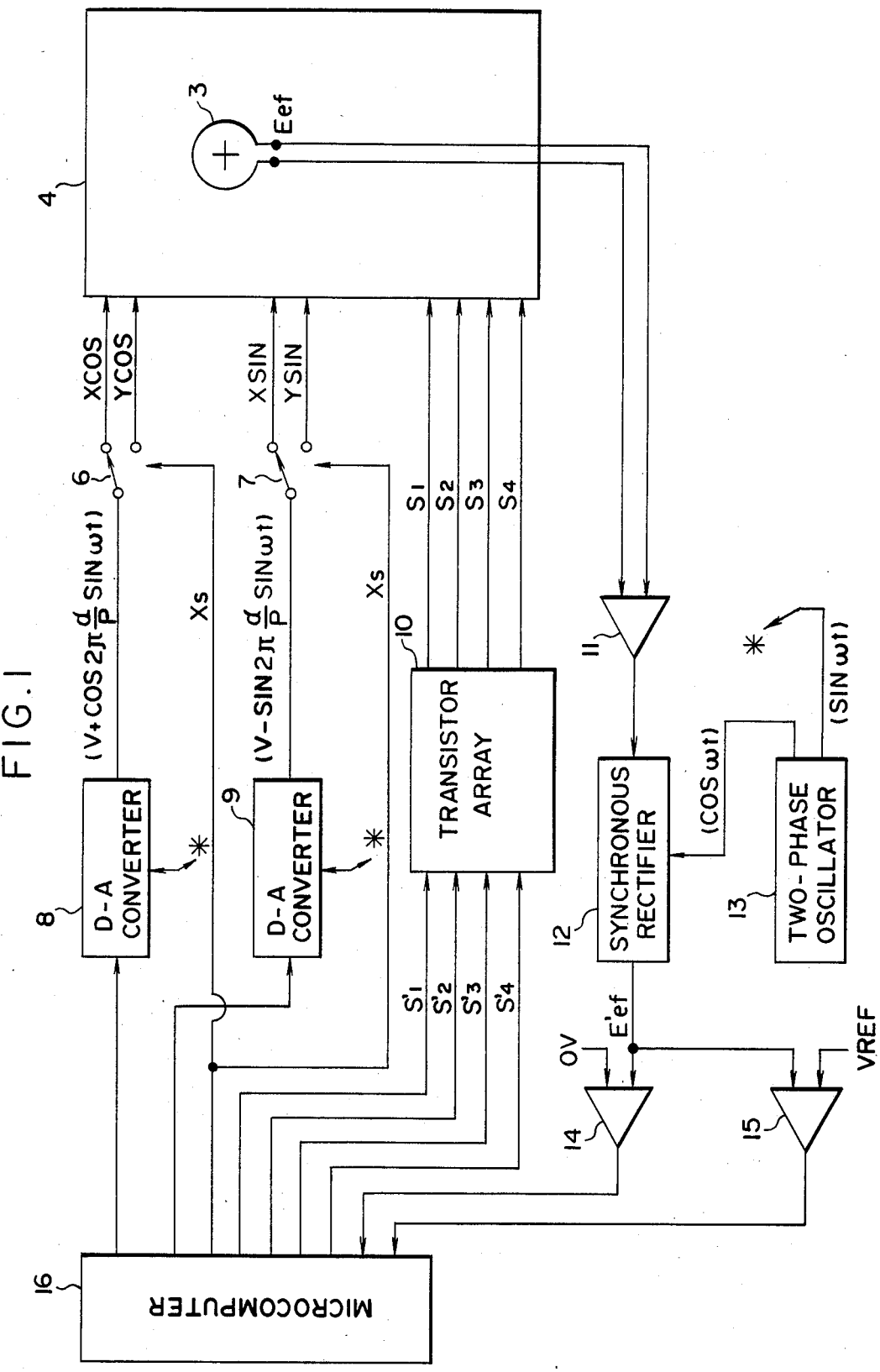

COORDINATE READER

BACKGROUND OF THE INVENTION

1. Field of the Invention

This invention relates to a coordinate reader (generally referred to as a digitizer) based on electromagnetic coupling for detecting coordinates of a cursor.

2. Description of the Prior Art

Conventionally, it has been practiced to detect coordinates of a cursor by A-D converting the amplitude of a voltage induced in a magnetic flux detecting coil or in conductor loops formed on an electrically insulating board, or by measuring an interval of time until occurrence of phase inversion of an induced voltage. However, the former method faces a problem that the magnitude of the induced voltage changes with a slight deflection of the cursor from the electrically insulating board and a means for correcting the height of the cursor is needed. The latter method can be dispensed with the cursor height correcting means as required for the former method but suffers from a problem that accuracies of the coordinate detection based on the time measurement are directly affected by temperature dependent changes in constants of circuit parts. For these reasons, both the methods encounter difficulties in highly accurate coordinate reading and besides suffer expensiveness.

SUMMARY OF THE INVENTION

An object of this invention is to provide an accurate and inexpensive coordinate reader which can eliminate the above drawbacks of the conventional coordinate reader and which can be dispensed with any means for cursor height correction and any time measuring means.

According to this invention, to accomplish the above object, there is provided a coordinate reader comprising first and second conductor loops each having an electrical conductor alternately folded at a period P so that the electrical conductors of the respective conductor loops are juxtaposed on an electrically insulating board, cosine function generating means, connected to one of the first and second conductor loops, for generating an output voltage whose amplitude oscillates in the form of a cosine function of a variable $\alpha$, where the variable $\alpha$ is representative of a distance from an origin in one of a plurality of periodic regions respectively defined by the electrical conductor of the first or second conductor loop folded alternately at the period P, sine function generating means, connected to the other of the first and second conductor loops, for generating an output voltage whose amplitude oscillates in the form of a sine function of the variable $\alpha$, a cursor incorporating a magnetic flux detecting coil for detecting magnetic fluxes generated in the conductor loops excited by the cosine function generating means and sine function generating means, and processing means for setting the period P and the variable $\alpha$ in the cosine function generating means and the sine function generating means, increasing or decreasing the variable $\alpha$ in predetermined incremental or decremental unit to excited the first and second conductor loops to thereby generate an induce voltage in the cursor, and detecting a value of the variable $\alpha$ as coordinates of the cursor within one periodic region when the phase of the induced voltage is inverted. To explain, the coordinates of the cursor can be detected by detecting the phase inversion and the maximum amplitude of the voltage induced in the cursor to ensure rapid and accurate coordinate reading. Especially, accuracies of the reading are mainly determined by the detection of phase inversion of the induced voltage in the cursor and therefore can be improved considerably as compared to those of the conventional apparatus. Further, this invention can be dispensed with the cursor height correcting means and time measuring means as required for the conventional apparatus as well as any A-D converters and therefore can ensure inexpensive production.

Another object of this invention is to provide a coordinate reader capable of improving the degree of approximation of the induced voltage in the cursor.

According to this invention, this object can be accomplished by an embodiment wherein the electrical conductor of each of the first and second conductor loops is connected with two or more return lines.

Still another object of this invention is to provide a coordinate reader capable of making a decision as to which one of the plurality of periodic regions the cursor lies in.

According to this invention, this object can be accomplished by an embodiment wherein a plurality of current switches are each connected to respective alternate folding points of the electrical conductor of each of the first and second conductor loops, a predetermined value is added to or subtracted from coordinates of the cursor which have been detected within one periodic region so as to provide or value of the variable $\alpha$, this value of the variable $\alpha$ is set in the cosine function generating means and the sine function generating means to excite the first and second conductor loops, and the number of periodic regions to be excited is increased or decreased by sequentially switching the plurality of current switches.

Still another object of this invention is to provide a coordinate reader capable of determining the position of the cursor within one periodic region by using an inexpensive DC switches.

According to this invention, this object can be accomplished by an embodiment wherein the output voltages of the cosine function generating means and the sine function generating means are added with a DC voltage of a level which is more than half the maximum amplitude of those output voltages.

Still another object of this invention is to provide a coordinate reader capable of reading two-dimensional coordinates.

According to this invention, this object can be accomplished by an embodiment wherein two pairs of first and second conductor loops are formed on the electrically insulating board, the first and second conductor loops of one pair being orthogonal to the first and second conductor loops of the other pair.

BRIEF DESCRIPTION OF THE DRAWINGS

FIG. 1 is a block diagram showing a coordinate reader according to an embodiment of the invention.

DESCRIPTION OF PREFERRED EMBODIMENT

Figure 2A:
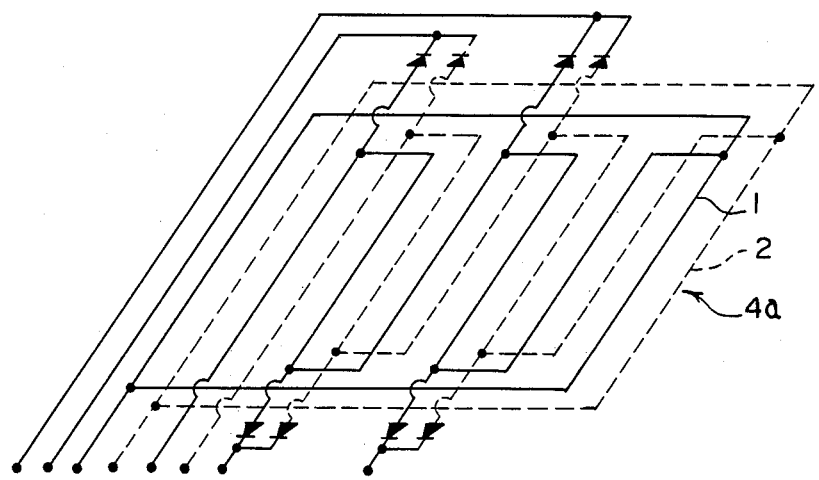
FIGS. 2A to 2C are exploded perspective views showing an electrically insulating board formed with two pairs of first and second conductor loops.
Figure 2B:
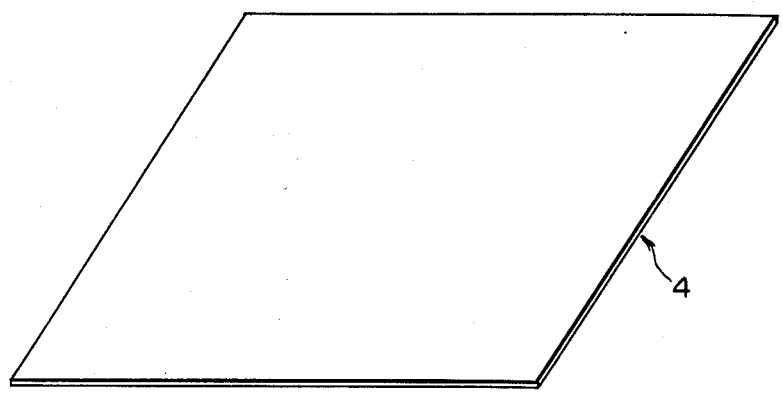
Figure 2C:
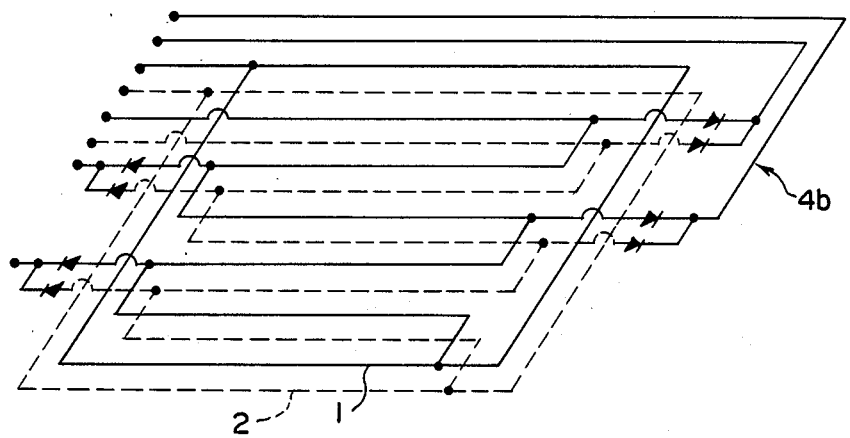
Figure 3A:
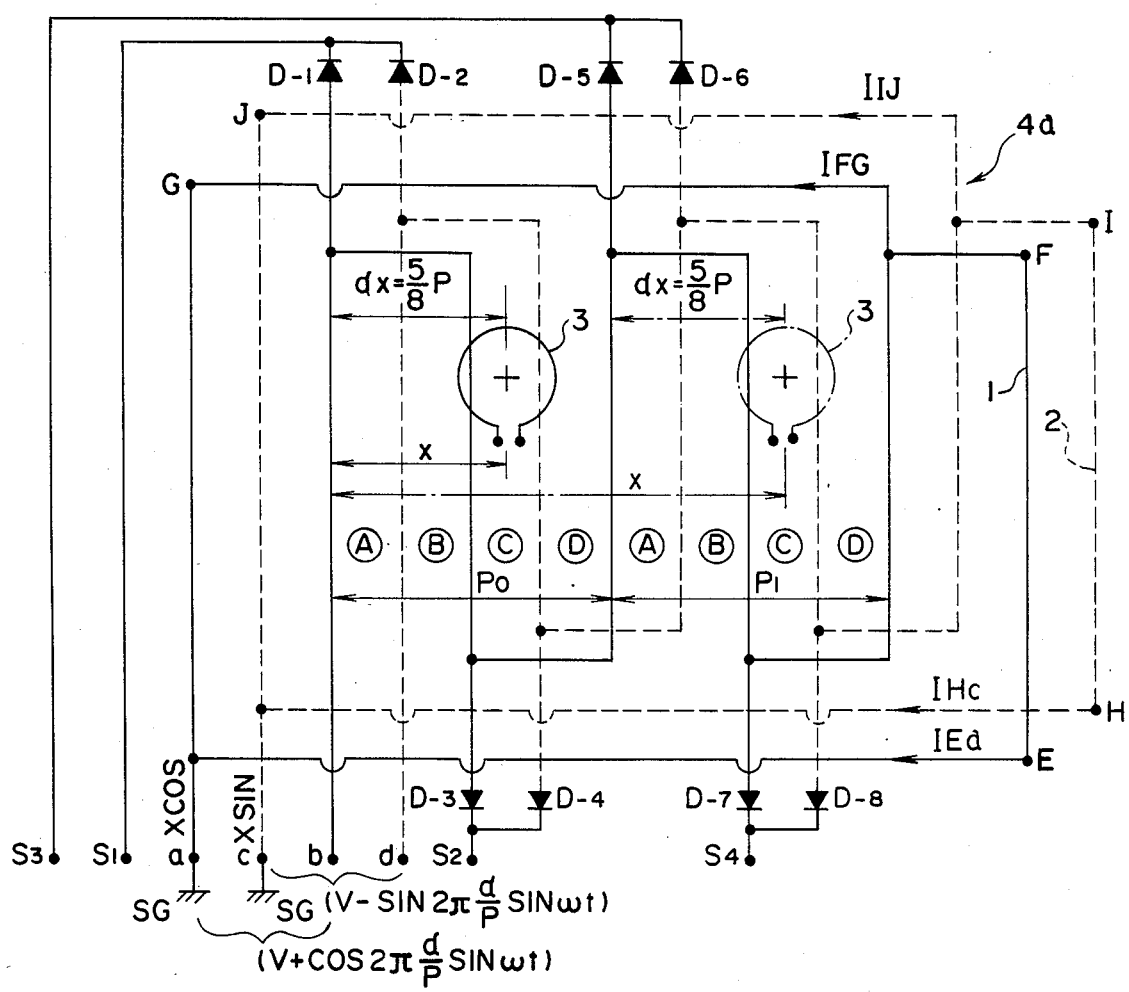
FIG. 3A is a circuit diagram of conductor loops for X-coordinate detection.
Figure 5:
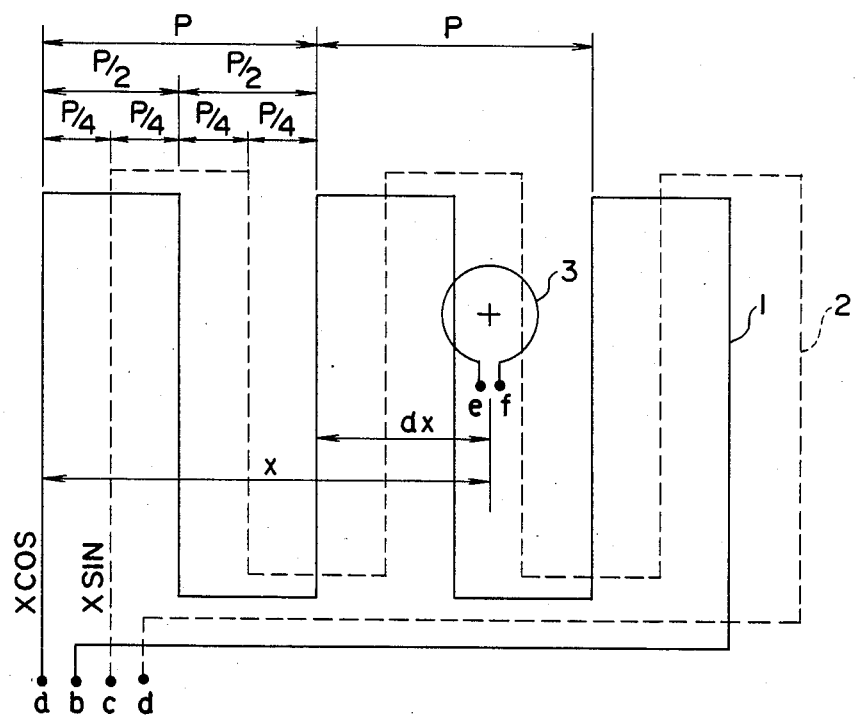
FIG. 5 is a schematic diagram showing the arrangement of electrical conductors prior to completing the FIG. 4 arrangement.

Referring to FIG. 1, a coordinate reader embodying the invention comprises a cursor 3 incorporating a magnetic flux detection coil, and an electrically insulating board 4. As shown in FIGS. 2A to 2C, the electrically insulating board 4 has the front surface printed with conductor loops 4a for detection of X-coordinates and the rear surface printed with conductor loops 4b for detection of Y-coordinates. The X-coordinates and Y-coordinates are orthogonal to each other to permit reading of two-dimensional coordinates. Since the arrangement of the conductor loops for X-coordinate detection is indentical with that of the conductor loops for Y-coordinate detection, only the X-coordinate detecting conductor loops 4a will hereafter be described, which substitutes for a description of the Y-coordinate detecting conductor loops 4b. The X-coordinate detecting conductor loops 4a are configured as shown in FIG. 3A. Specifically, as best seen from FIG. 5, the conductor loops 4a has a first conductor loop wherein an electrical conductor 1 (XCOS conductor) is alternately folded at a pitch of P/2 and a second conductor loop wherein an electrical conductor 2 (XSIN conductor) is alternately folded at the same pitch, and the first and second conductor loops are displaced from each other by P/4 pitch so that electrical conductors 1 and 2 are juxtaposed on the same plane. Thus, the period for folding is P. When the conductor loops 4a are excited by applying an AC voltage Eab sin ωt between terminals a and b and an AC voltage Ecd sin ωt between terminals c and d, the cursor 3 incorporating the magnetic flux detection coils produces across terminals e and f an induced voltage Eef which approximates the following equation;

$$Eef \approx A \cdot Eab \cos \omega t \cdot \sin 2\pi \cdot x/p + A \cdot Ecd \cos \omega t \cdot \cos 2\pi \cdot x/p \quad (1)$$

where A represents a coupling coefficient between the conductor loops and the cursor 3, and x a distance between the center of the cursor 3 and an electrical cunductor XCOS at the lefthand extreme.

It is now assumed that Eab and Ecd are set to voltage values which are indicated using a variable α as follows;

$$Eab = \cos 2\pi \cdot \alpha/p \quad (2)$$

$$Ecd = -\sin 2\pi \cdot \alpha/p \quad (3)$$

Then by substituting equations (2) and (3) into equation (1), there results equation (4) which is indicative of the induced voltage Eef in the cursor 3.

$$Eef \approx A \cdot \cos \omega t \sin [2\pi(x-\alpha)/p] \quad (4).$$

It will be seen from equation (4) that when is varied to increase (increment) or decrease (decrement), Eef becomes 0 (zero) bolt at $x-\alpha=np$ where $n=0, 1, 2 \ldots$, and the phase of Eef is inverted before and after $x-\alpha=nP$. Thus, assuming that α takes a value of αx when, under increasing variation of α, the phase Eef is inverted from cos ωt to −cos ωt or when, under decreasing variation of α, the phase of Eef is inverted from −cos ωt to cos ωt, the value αx represents coordinates within a region corresponding to one period P (hereinafter referred to as periodic region). Accordingly, by detecting the αx and the n which is determined by the fact as to which periodic region the cursor lies in, coordinates of x represented by αx+np can be calculated. This invention is based on this fundamental principle.

Figure 4:
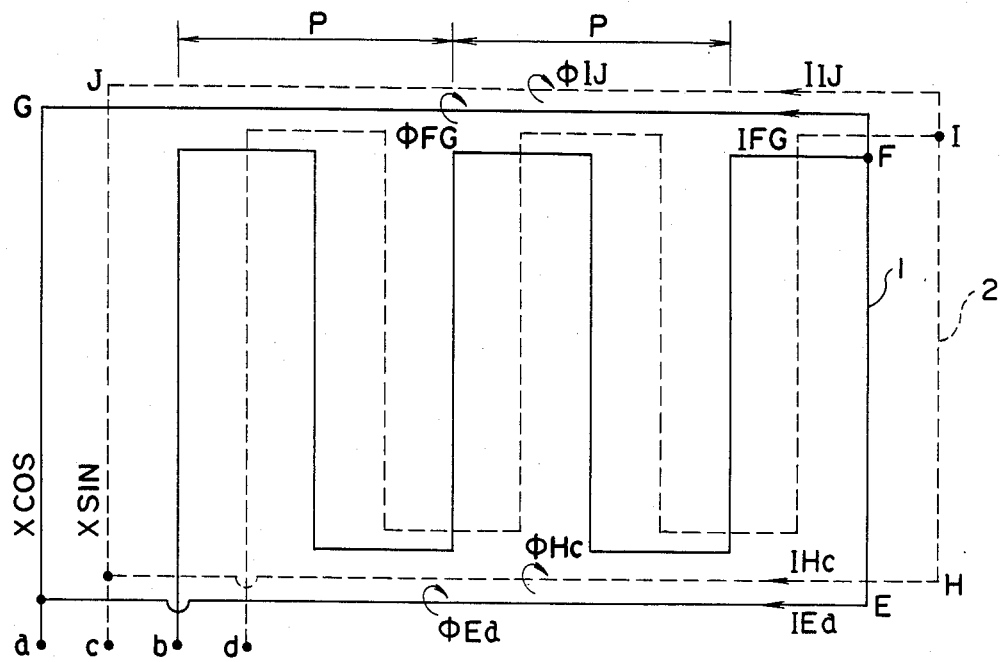
FIG. 4 is a schematic diagram showing the arrangement of electrical conductors prior to completing the conductor loops shown in FIG. 3A.

The conductor loops 4a have, in addition to current return lines FEa and IHc (respectively extending from point F and terminating in the terminal a through point E and extending from point I and terminating in the terminal c through point H), current return lines FGa and IJc, as particularly shown in FIG. 4, to ensure that magnetic fluxes $\phi Ea$ and $\phi Hc$ generated by return currents IEa and IHc can be cancelled as illustrated by arrows by magnetic fluxes $\phi FG$ and $\phi IJ$ generated by return currents IFG and IIJ to minimize magnetic flux distortion due to the return lines FEa and IHc, thereby improving degree of approximation pursuant to equation (4). Further, as shown in FIG. 3A, the electrical conductors 1 and 2 of the conductor loops shown in FIG. 4 are also connected to current switches $S_1$ to $S_4$ via diodes D-1 and D-2, D-3 and D-4, D-5 and D-6, and D-7 and D-8, respectively. By controlling the operation of the switches $S_1$ to $S_4$, the number of periodic regions to be excited can be increased or decreased to permit the detection as to which periodic region the cursor lines in, on the basis of the amplitude and phase of the induced voltage Eef in the cursor 3. To this end, the following expedient is employed. More particularly, the AC voltages cos $2\pi \cdot \alpha/p \cdot \sin \omega t$ and $-\sin 2\pi \cdot \alpha/p \cdot \sin \omega t$ are each added with a DC voltage V of a level which is more than half the maximum amplitude of each AC voltage to obtain V+cos $2\pi \cdot \alpha/p \cdot \sin \omega t$ and V−sin $2\pi \cdot \alpha/p \cdot \sin \omega t$ which are, as shown in FIG. 3A, used to excite the conductor loops (equation (4) remains unaffected by V since the voltage induced in the cursor is attributable only to AC components). This ensures that the number of periodic regions to be excited can be increased or decreased using diodes and transistors standing for inexpensive DC current switches without resort to expensive AC switches.

Returning to FIG. 1, transfer switches 6 and 7, comprised of transistors and integrated circuits, are operated by an X/Y-coordinate detection signal Xs. When the detection signal Xs is low (0 volt), the X-coordinate detecting conductor loops 4a (X cos and X sin conductors) are excited and when high (+5 volts), the Y-coordinate detecting conductor loop 4b (Y cos and Y sin conductors) are excited.

Multiplication type D-A converters 8 and 9 respectively receive digital signals representative of cos $2\pi \cdot \alpha/p$ and $-\sin 2\pi \cdot \alpha/p$ which are generated from a microcomputer 16, multiply these digital signals by an analog signal of sin ωt produced from a two-phase oscillator 13, and add the products with the DC voltage V having a level which is the sum of half the maximum amplitude of the sin ωt (that is, the maximum value of cos $2\pi \cdot \alpha/p$ or sin $2\pi \cdot \alpha/p$) and a drop voltage across each of the diodes D-1 to D-8 and a transistor array 10 which are rendered conductive, thereby generating analog signals v+cos $2\pi \cdot \alpha/p \sin \omega t$ and V −sin $2\pi \cdot \alpha/p$ sin ωt which in turn are delivered to the transfer switches 6 and 7. In order to expedite program processings in the microcomputer, the digital signals cos $2\pi \cdot \alpha/p$ and $-\sin 2\pi \cdot \alpha/p$ are not generated through arithmetic operations but a numerical table of cos $2\pi\cdot\alpha/p$ and $-\sin 2\pi\cdot\alpha/p$, in which numerical values thereof are described in accordance with incremental or decremental unit of the variable $\alpha$, is stored in part of the progam and a numerical value is delivered out by referring to the table each time the variable $\alpha$ is varied to increase or decrease.

The transistor array 10 is connected to receive periodic region detecting signals $S'_1$ to $S'_4$ produced from the microcomputer 16 and when these signals are high (+5 volts), it brings the current switches $S_1$ to $S_4$ into conduction to signal ground SG. An amplifier 11 amplifies the voltage induced in the cursor 3. A synchronous rectifier 12 is adapted to rectify the voltage, induced in the cursor 3 and amplified by the amplifier 11, in synchronism with an output signal cos $\omega t$ from the two-phase oscillator 13. An output signal of the synchronous rectifier 12 is applied to voltage comparators 14 and 15. As will be appreciated from the above, the two-phase oscillator 13 is operative to produce the two signal sin $\omega t$ and cos $\omega t$. The voltage comparator 14 compares an induced voltage $E'ef$ in the cursor 3 after synchronous rectification (output signal of the synchronous rectifier 12) with a reference voltage of 0 (zero) volt, and produces a high signal (+5 volts) when the reference voltage is higher and a low signal (0 volt) when lower. The high or low signal is applied to the microcomputer 16. The voltage comparator 15 compares the induced voltage $E'ef$ with a reference voltage VREF (which is set to approximate the negative maximum level of the induced voltage $E'ef$ in the cursor subject to the synchronous rectification) to produced a high signal (+5 volts) when the reference voltage VREF is higher and a low signal (0 volt) when lower. This high or low signal is also applied to the microcomputer 16.

The microcomputer 16 incorporates a coordinate detection and processing program and is responsive to the output signals of the voltage comparators 14 and 15 to deliver out the digital signals cos $2\pi\cdot\alpha/p$ and $-\sin 2\pi\cdot\alpha/p$, periodic region detecting signals $S'_1$ to $S'_4$ and X/Y-coordinate detection signal Xs. More specifically, as far as the output signal of the voltage comparator 14 is concerned, the coordinate detection and processing program of the microcomputer 16 is such that when the output signal is low indicating that the phase of the induced voltage Eef in the cursor 3 is cos $\omega t$, the variable $\alpha$ is added in incremental or decremental unit until the addition stops upon occurrence of inversion of the phase (which makes high the output signal of the voltage comparator 14) and when the output signal from the voltage comparator 14 is high indicating that the phase of the induced voltage Eef in the cursor is $-\cos \omega t$, the variable $\alpha$ is subtracted or decreased incremental or decremental unit until the subtraction stops upon occurrence of the phase inversion (which makes low the output signal of the voltage comparator 14). As far as the output signal of the voltage comparator 15 is concerned, on the other hand, the program of the microcomputer 16 is such that when the output signal of the voltage comparator 15 is low, the periodic region detecting signals $S'_1$ to $S'_4$ are sequentially switched over so as to be applied to the transistor array 10 and when becomes high, the Sequential Switching operation is stopped in response to a high signal currently occurring and this specified signal is memorized. The incremental or decremental unit of the variable $\alpha$ is set to fall within one period P, thus being 1/16P, for example. In this instance, the variable $\alpha$ is therefore incremented through 0, 1/16P, 2/16P ... 15/16P, 0, 1/16P, 2/16P ... and decremented through 0, 15/16P, 14/16P ... 0, 15/16P, 14/16P ...

The operation of the reader will now be described by referring to an instance where the cursor 3 is positioned as indicated at soled line in FIG. 3A.

When the coordinate detection and processing program of the microcomputer 16 is started, the X/Y -coordinate detecting signal Xs from the micro computer 16 is first rendered low and applied to the transfer switches 6 and 7, making the X-coordinate detection conductor loops 4a (X cos and X sin conductors) ready for excitation. Subsequently, the variable $\alpha$ is set to be zero and cos 0 and $-\sin 0$ are generated which in turn are delivered, in the form of digital signals, out of the microcomputer 16 and supplied to the D-A converters 8 and 9.

Figure 3B:
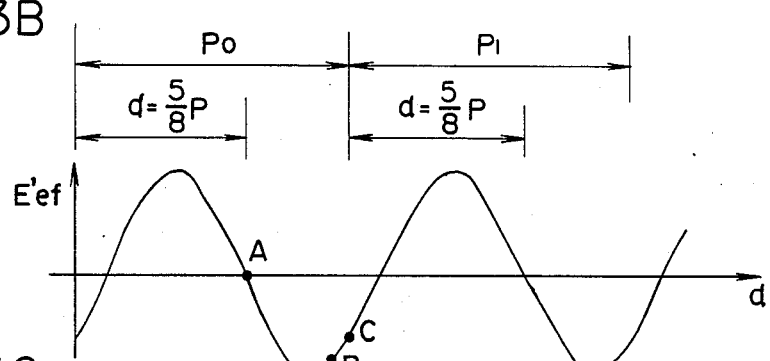
FIGS. 3B and 3C show output voltage waveforms produced from the conductor loops shown in FIG. 3A.

The D-A converter 8 multiplied cos 0 (digital value) by the output signal sin $\omega t$ (analog value) of the two-phase oscillator 13 to produce an AC voltage cos 0·sin $\omega t$, and adds this AC voltage with the DC voltage V to produce V+cos 0·sin $\omega t$ which in turn is fed to the transfer switch 6. On the other hand, the D-A converter 9 multiplied $-\sin 0$ (digial value) by the output signal sin $\omega t$ (analog value) of the two-phase oscillator 13 to produce an AC voltage $-\sin 0\cdot\sin \omega t$, and adds this AC voltage $-\sin 0\cdot\sin \omega t$, and adds this AC voltage with the DC voltage V to produce V$-\sin 0\cdot\sin \omega t$ which in turn is fed to the transfer switch 7. The X/Y-coordinate detecting signal Xs has already been rendered low (0 volt) and hence the X-coordinate detecting conductor loops 4a (X cos and X sin conductors) on the electrically insulating board 4 are excited to cause an induced voltage Eef in the cursor 3. The induced voltage Eef is then amplified. by the amplifier 11 and sent to the synchronous rectifier 12. This rectifier 12 rectifies the Eef in synchronism with the output signal cos $\omega t$ of the two-phase oscillator 13 to produce an output signal $E'ef$. In case where the cursor 3 is positioned as shown at solid line in FIG. 3A, the $E'ef$ takes a level corresponding to point C in FIG. 3B, having the phase of $-\cos \omega t$ which is representative of a negative voltage. The voltage comparator 14 compares this induced voltage $E'ef$ with 0 (zero) volt and delivers the high signal to the microcomputer 16 since the reference voltage of 0 volt is higher. With the high signal delivered out of the voltage comparator 14, the coordinate detection and processing program of the microcomputer 16 is directed to subtraction in incremental or decremental unit of 1/16P as described previously and therefore, 1/16P is subtracted from 0 (zero) and $\alpha$ takes a value of 15/16P. As in the case of $\alpha=0$, digital signals cos $2\pi\cdot 15/16$ and $-\sin 2\pi\cdot 15/16$ are subsequently delivered out of the microcomputer 16, and V+cos $2\pi\cdot 15/16\cdot\sin \omega t$ and V$-\sin 2\pi\cdot 15/16\cdot \sin \omega t$ excite the X-coordinate detecting conductor loops 4a (X cos and X sin conductors) on the electrically insulating board 4, so that an induced voltage $E'ef$ corresponding to point B in FIG. 3B is produced from the synchronous rectifier 12. Since this induced voltage $E'ef$ has the phase of $-\cos \omega t$ which is representative of a negative voltage, the microcomputer 16 again receives the high signal and the variable $\alpha$ is again subjected to subtraction to reach 14/16P. The above subtraction is repeated until $\alpha$ becomes 10/16P=$\frac{5}{8}$P at which the synchronous rectifier 12 delevers an induced voltage $E'ef$ corresponding to point A in FIG. 3B. At this time, the phase is inverted from $-\cos \omega t$ to cos $\omega t$, indicating that this induced voltage E'ef is inverted from negative to positive. Consequently, the voltage comparator 14 delivers the low signal to the microcomputer 16 to stop the subtraction of $\alpha$. In this manner, the coordinate $\alpha x$ of cursor 3 within the periodic region is detected as $\frac{5}{8}P$.

Figure 3C:
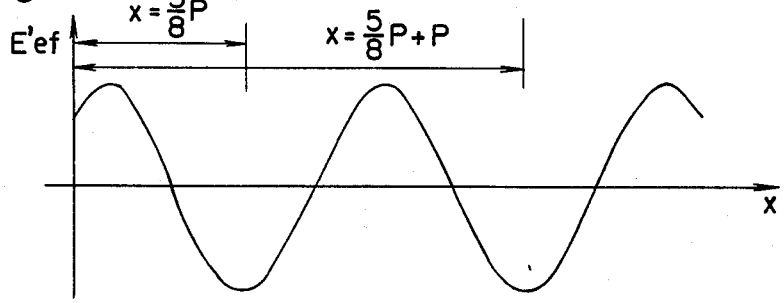

After the detection of $\alpha x$ has been completed, $\alpha x = \frac{5}{8}P$ is added with $\frac{1}{4}P$ to obtain $\frac{7}{8}P$ $(=\frac{5}{8}P+\frac{1}{4}P)$. Then, the variable $\alpha$ is updated to this $\frac{7}{8}P$. Like the coordinate detection within the periodic region, the microcomputer 16 delivers out digital signals $\cos 2\pi \cdot \frac{7}{8}$ and $-\sin 2\pi \cdot \frac{7}{8}$, and $V + \cos 2\pi \cdot \frac{7}{8} \cdot \sin \omega t$ and $V - \sin 2\pi \cdot \frac{7}{8} \sin \omega t$ excite the X-coordinate detecting conductor loops 4a (X cos and X sin conductors). Then, an induced voltage Eef in the cursor 3 is rectified in synchronism with the output signal $\cos \omega t$ of the two-phase oscillator 13 to obtain an induced voltage E'ef which varies as shown in FIG. 3C with respect to variation of position x of the cursor 3. In this wave form of FIG. 3C, the induced voltage E'ef has the negative has the negative maximum value (i.e., the phase being $-\cos \omega t$ and the amplitude being maximum) at $x = \frac{5}{8}P$ and $x = \frac{5}{8}P + P$. These positions corresponding to the negative maximum value do not vary even when the number of periodic regions to be excited varies. Accordingly, while maintaining this status, the periodic region detecting signals $S'_1$ to $S'_4$ are sequentially switched and delivered out of the microcomputer 16 in the order of $S'_1$, $S'_2$, $S'_3$, and $S'_4$ to check whether the output signal of the voltage comparator 15 is high. In other words, it is checked as to whether the induced voltage Eef in the cursor 3 has the phase which is $-\cos \omega t$ and the amplitude which approximates the maximum level. To detail this procedure, only the signal $S'_1$ is first rendered high and applied to the transistor array 10. As a result, only the current switch $S_1$ is rendered conductive to connect to the signal ground SG, bringing an electrical conductor connected to the diode D-2 and an electrical conductor preceding (lefthand conductor in FIG. 3A) the conductor connected to the diode D-2 into excitation. Since, under this condition, the cursor 3 is outside the exciting region, an induced voltage in the cursor 3 is small and an output signal E'ef of the synchronous rectifier 12 does not fall below the reference voltage VREF, thus causing the voltage comparator 15 to deliver the low signal to the microcomputer 16. After the issuance of the periodic region detecting signal $S'_1$ from the microcomputer 16, the output signal of the voltage comparator 15 is thus rendered low. Subsequently, only the $S'_2$ is therefore rendered high and delivered to the transistor array 10. As a result, only the current switch $S_2$ is rendered conductive to connect to the signal ground SG, bringing an electrical conductor connected to the diode D-4 and electrical conductors preceding (left hand conductors in FIG. 3A) the conductor connected to the diode D-4 into excitation. Since, under this condition, the cursor 3 is inside the exciting region, and induced voltage Eef in the cursor 3 has the phase of $-\cos \omega t$ and the maximum amplitude and an induced signal E'ef after the synchronous rectification falls below the reference voltage VREF, thus causing the voltage comparator 15 to deliver the high signal to the microcomputer 16. Since the output signal of the voltage comparator 15 is thus rendered high after the issuance of the periodic region detecting signal $S'_2$, the microcomputer 16 stores the $S'_2$. The value of $\alpha x$ indicates that the coordinate $\alpha x$ within periodic region in this instance falls within a region ⓒ in FIG. 3A. Therefore, this region ⓒ cooperates with the signal $S'_2$ to decide that the cursor 3 lies within the periodic region Po, and the coordinates x can be calculated as $\frac{5}{8}P + 0$.

Similarly, where the cursor 3 lies as shown at chained line in FIG. 3A, the induced voltage E'ef assumes the negative maximum value when the current switch $S_4$ is rendered conductive and hence it is decided that the cursor 3 lies within the periodic region $P_1$, with the x coordinates being calculated as $\frac{5}{8}P + P$. In this manner, the detection of the x coordinates comes to an end.

After completion of the detection of the x coordinates, the X/Y-coordinate detecting signal Xs from the microcomputer 16 is rendered high, so that the Y-coordinate detecting conductor loops 4b (Y cos and Y sin conductors) are excited to detect y coordinates in a similar manner to the x coordinates.

Thus, the coordinates of the cursor can be detected by detecting the x coordinates and the y coordinates.

For simplicity of explanation and only for illustration purpose, the variable $\alpha$ is varied in incremental or decremental unit of 1/16P and the number of periodic regions is two in the foregoing embodiment but these values may obviously be set desirably.

The invention has been described in detail sufficient to enable one of ordinary skill in the art to make and use the same. It is believed that certain modifications and alterations of the preferred embodiment will occur to others upon a reading and understanding of the specification, and it is intended to include all such alternations and modifications as part of the invention, insofar as they come within the scope of the appended claims.

What is claimed is:

1. A coordinate reader comprising:
   an electrically insulating board;
   a pair of first and second conductor loops each having an electrical conductor alternately folded at a period P so that the electrical conductors of the respective conductor loops are juxtaposed on said electrically insulating board;
   cosine function generating means, connected to one of said first and second conductor loops, for generating an output voltage whose amplitude oscillates in the form of a cosine function of a variable $\alpha$, where the variable $\alpha$ is representative of a distance from an origin in one of a plurality of periodic regions respectively defined by the electrical conductor of said first or second conductor loop folded alternately at the period P;
   sine function generating means, connected to the other of said first and second conductor loops, for generating an output voltage whose amplitude oscillates in the form of a sine function of the variable $\alpha$;
   a cursor incorporating a magnetic flux detecting coil for detecting magnetic fluxes generated in said conductor loops excited by said cosine function generating means and sine function generating means;
   processing means for setting the period P and the variable $\alpha$ in said cosine function generating means and said sine function generating means, increasing or decreasing the variable $\alpha$ in predetermined incremental or decremental unit to excite said first and second conductor loops to thereby generate an induced voltage in said cursor, and detecting a value of the variable $\alpha$ as coordinate of said cursor within one periodic region when the phase of the induced voltage is inverted, and a plurality of current switches are each connected to respective alternate folding points of said electrical conductor of each of said first and second conductor loops, a predetermined value is added to or subtracted from coordinates of said cursor which have been detected within one periodic region so as to provide a value of the variable $\alpha$, this value of the variable $\alpha$ is set in said cosine function generating means and said sine function generating means to excite said first and second conductor loops, and the number of periodic regions to be excited is increased or decreased by sequentially switching the plurality of current switches.

2. A coordinate reader comprising:

an electrically insulating board;

a pair of first and second conductor loops each having an electrical conductor alternately folded at a period P so that the electrical conductor of the respective conductor loops are juxtaposed on said electrically insulating board;

cosine function generating means, connected to one of said first and second conductor loops, for generating an output voltage whose amplitude oscillates in the form of a cosine function of a variable $\alpha$, where the variable $\alpha$ is representative of a distance from an origin in one of a plurality of periodic regions respectively defined by the electrical conductor of said first or second conductor loop folded alternately at the period P;

sine function generating means, connected to the other of said first and second conductor loops, for generating an output voltage whose amplitude oscillates in the form of a sine function of the variable $\alpha$;

a cursor incorporating a magnetic flux detecting coil for detecting magnetic fluxes generated in said conductor loops excited by said cosine function generating means and sine function generating means;

processing means for setting the period P and the variable $\alpha$ in said cosine function generating means and said sine function generating means, increasing or decreasing the variable $\alpha$ in predetermined incremental or decremental unit to excite said first and second conductor loops to thereby generate an induced voltage in said cursor, and detecting a value of the variable $\alpha$ as coordinate of said cursor within one periodic region when the phase of the induced voltage is inverted, and the output voltages of said cosine function generating means and said sine function generating means are added with a DC voltage of a level which is more than half the maximum amplitude of those output voltages.

* * * * *